US007859137B2

(12) United States Patent
Winans

(10) Patent No.: US 7,859,137 B2
(45) Date of Patent: Dec. 28, 2010

(54) SCALABLE SWITCH DEVICE AND SYSTEM

(75) Inventor: John Winans, Glen Ellyn, IL (US)

(73) Assignee: TAP.TV, Inc., Burr Ridge, IL (US)

( * ) Notice: Subject to any disclaimer, the term of this patent is extended or adjusted under 35 U.S.C. 154(b) by 335 days.

(21) Appl. No.: 12/176,150

(22) Filed: Jul. 18, 2008

(65) Prior Publication Data

US 2009/0280680 A1 Nov. 12, 2009

Related U.S. Application Data

(60) Provisional application No. 61/052,083, filed on May 9, 2008.

(51) Int. Cl.

| | |
|---|---|
| ***H01B 7/30*** | (2006.01) |
| ***H01B 11/02*** | (2006.01) |
| ***H02B 1/20*** | (2006.01) |
| ***H02G 5/06*** | (2006.01) |

(52) U.S. Cl. ....................................................... 307/147

(58) Field of Classification Search ................. 307/115, 307/147; 439/49, 540.1

See application file for complete search history.

(56) References Cited

U.S. PATENT DOCUMENTS

| | | | |
|---|---|---|---|
| 4,516,156 | A | 5/1985 | Fabris |
| 4,645,872 | A | 2/1987 | Pressman |
| 4,686,698 | A | 8/1987 | Tompkins |
| 4,700,230 | A | 10/1987 | Pshtissky |
| 4,882,743 | A | 11/1989 | Mahmoud |
| 4,947,244 | A | 8/1990 | Fenwick |
| 5,144,548 | A | 9/1992 | Salandro |
| 5,162,904 | A | 11/1992 | Beaulier |
| 5,195,086 | A | 3/1993 | Baumgartner |
| 5,226,160 | A | 7/1993 | Waldron |
| 5,389,963 | A | 2/1995 | Lepley |
| 5,500,794 | A | 3/1996 | Fujita |
| 5,754,255 | A | 5/1998 | Takamori |

(Continued)

FOREIGN PATENT DOCUMENTS

| | | | |
|---|---|---|---|
| KR | 20020086804 | A | 11/2002 |

OTHER PUBLICATIONS

Han, Seon Kyoung; International Search Report; Nov. 25, 2009; 3 pages.

*Primary Examiner*—Jared J Fureman
*Assistant Examiner*—Carlos Amaya
(74) *Attorney, Agent, or Firm*—Fitch, Even, Tabin & Flannery

(57) ABSTRACT

A scalable switch system and method for connecting a plurality of output devices to a plurality of media source includes an array of input connectors and a first array of first jumper connectors electrically connected to the array of input connectors such that at least one input connector of the array of input connectors electrically connects to a first jumper connector. The input connector connected to the first jumper connector is electrically connected to a termination resistance when the first jumper connector for the input connector is in a first jumper configuration. A second array of the second jumper connectors is configured to make available to electrically connect one of at least two input connections to an output connector of the array of output connectors. Multiple switch devices may be interconnected to fit a variety of media systems.

21 Claims, 6 Drawing Sheets

U.S. PATENT DOCUMENTS

| | | | |
|---|---|---|---|
| 5,867,484 | A | 2/1999 | Shaunfield |
| 5,886,732 | A | 3/1999 | Humpleman |
| 5,917,557 | A | 6/1999 | Toyoda |
| 5,929,895 | A | 7/1999 | Berry |
| 5,995,505 | A | 11/1999 | Nakasaka |
| 5,999,966 | A | 12/1999 | McDougall |
| 6,038,425 | A | 3/2000 | Jeffrey |
| 6,058,288 | A | 5/2000 | Reed |
| 6,160,544 | A | 12/2000 | Hayashi |
| 6,201,580 | B1 | 3/2001 | Voltz |
| 6,263,503 | B1 | 7/2001 | Margulis |
| 6,426,769 | B1 | 7/2002 | Ludwig |
| 6,519,540 | B1 | 2/2003 | Salandro |
| 6,636,931 | B2 | 10/2003 | Shah |
| 6,768,499 | B2 | 7/2004 | Miller |
| 6,774,919 | B2 | 8/2004 | Miller |
| 6,834,390 | B2 | 12/2004 | Miller |
| 6,954,581 | B2 | 10/2005 | Miller |
| 6,959,438 | B2 | 10/2005 | Miller |
| 6,961,943 | B2 | 11/2005 | Miller |
| 6,993,721 | B2 | 1/2006 | Rosin et al. |
| 7,065,287 | B1 | 6/2006 | Heredia |
| 7,190,412 | B2 | 3/2007 | Ellett |
| 2002/0024591 | A1 | 2/2002 | Fenouil |
| 2002/0068610 | A1 | 6/2002 | Anvekar |
| 2002/0100051 | A1 | 7/2002 | Applewhite |
| 2002/0170062 | A1 | 11/2002 | Chen et al. |
| 2003/0081131 | A1 | 5/2003 | Farnan |
| 2003/0110217 | A1 | 6/2003 | Raju |
| 2003/0204852 | A1 | 10/2003 | Fenwick |
| 2003/0222982 | A1 | 12/2003 | Hamdan |
| 2004/0055006 | A1 | 3/2004 | Iwamura |
| 2005/0134746 | A1 | 6/2005 | Brandt |
| 2005/0195335 | A1 | 9/2005 | Gomez |
| 2005/0195823 | A1 | 9/2005 | Chen |
| 2005/0278364 | A1 | 12/2005 | Kamen |
| 2005/0289613 | A1 | 12/2005 | Lawrence |
| 2006/0001742 | A1 | 1/2006 | Park |
| 2006/0031889 | A1 | 2/2006 | Bennett |
| 2006/0141950 | A1 | 6/2006 | Kim |
| 2006/0174285 | A1 | 8/2006 | Brady |
| 2006/0184685 | A1 | 8/2006 | Blasingame |
| 2007/0041338 | A1 | 2/2007 | Rowe |
| 2007/0050828 | A1 | 3/2007 | Renzi |
| 2007/0076123 | A1 | 4/2007 | Ogilvie |
| 2007/0143576 | A1 | 6/2007 | Ellgen |
| 2007/0143801 | A1 | 6/2007 | Madonna |
| 2007/0199043 | A1 | 8/2007 | Morris |
| 2007/0248115 | A1 | 10/2007 | Miller |
| 2008/0062965 | A1 | 3/2008 | Silva |
| 2008/0066010 | A1 | 3/2008 | Brodersen et al. |
| 2008/0074343 | A1 | 3/2008 | Sasser |
| 2008/0127063 | A1 | 5/2008 | Silva |

FIG. 3
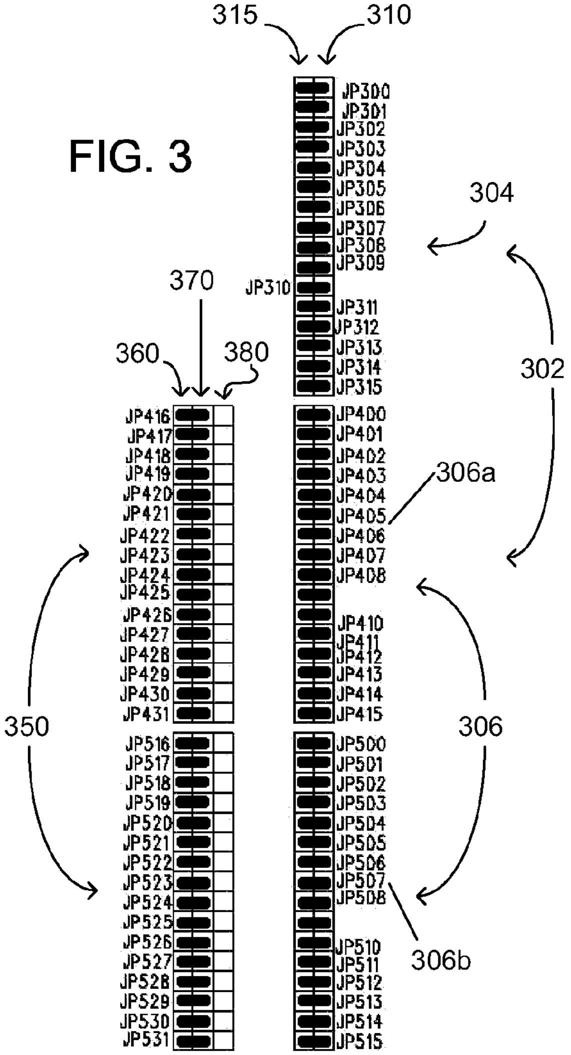
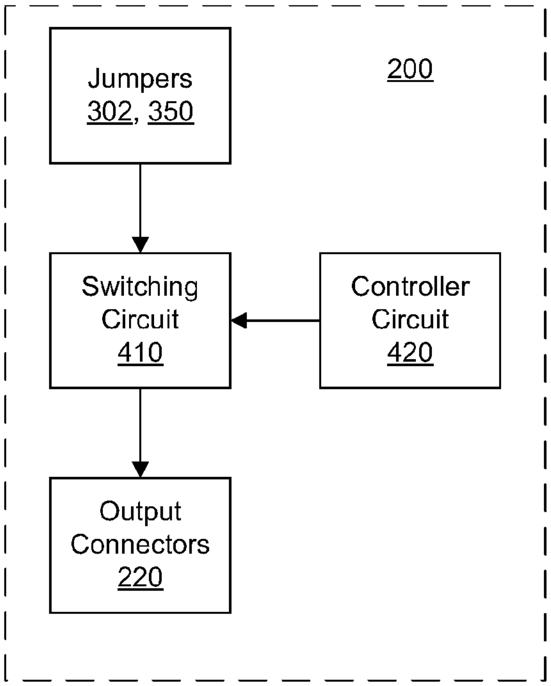
FIG. 4
FIG. 5
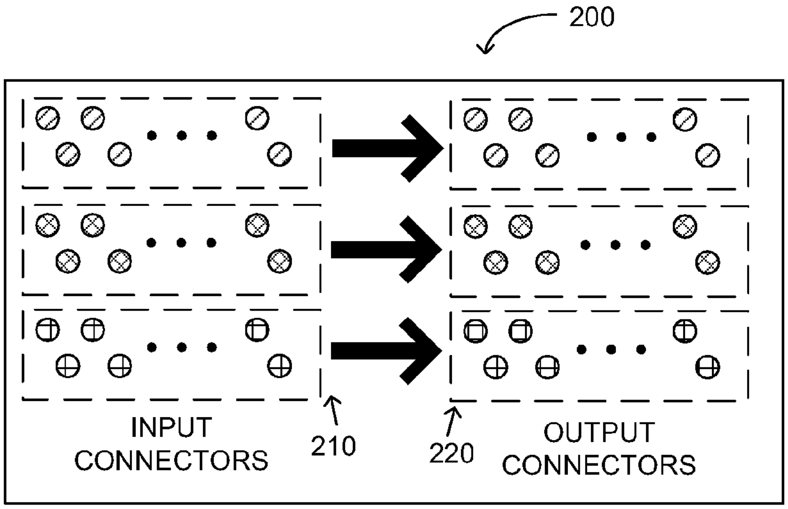

SCALABLE SWITCH DEVICE AND SYSTEM

RELATED APPLICATION(S)

This application claims the benefit of U.S. Provisional application Ser. No. 61/052,083, filed May 9, 2008, which is incorporated by reference in its entirety herein.

TECHNICAL FIELD

This invention relates generally to scalable switching systems and more particularly to switching systems for directing media signals from a plurality of media sources to a plurality of output devices.

BACKGROUND

There is an increasing rise of entertainment options available to various people and in today's public establishments, such as bars, restaurants, clubs, and the like. For example, there is an increasing number of available television channels and programming. Similarly, there is an increasing number of entertainment sources available to people such as cable TV, satellite TV, radio, satellite radio, or other programming options provided over networks such as Internet. This increase in entertainment options is also increasing the demand for the provision of multiple media streams in a single place. For example, at a bar or restaurant setting it is now common to have multiple audio sources and video sources such as television screens showing multiple media sources at one time. Similar systems may be built into a home where multiple televisions or output devices are connected to multiple media sources. Switching systems are necessary to connect or control the multiple sources that may be provided at multiple outlets.

Known devices that provide switching of media sources among multiple output devices are generally specially made inflexible devices and are expensive. Such switching systems typically comprise a single box with a specific set of available media input connections and output connections. Therefore, if the switching device does not fit a particular media system, either the media system will not be able to be fully optimized to provide a full media experience, or an even more expensive and specially or custom made switching device will need to be purchased. Accordingly, such known switching devices are generally not readily scalable and applicable to a variety of applications.

SUMMARY

Generally speaking, pursuant to various embodiments, a scalable switch system for connecting a plurality of output devices to a plurality of media source includes an array of input connectors configured to receive media signals from an array of a plurality of output connectors configured to provide media signals. The scalable switch system includes a first array of a plurality of first jumper connectors electrically connected to the array of plurality of input connectors such that at least one input connector of the array of input connectors electrically connects to a first jumper connector. The input connector connected to the first jumper connector of the array of jumper connectors is electrically connected to a termination resistance when the first jumper connector for the input connector is in a first jumper configuration.

A second array of a plurality of second jumper connectors is configured to electrically connect one of at least two input connectors to an output connector of the plurality of output connectors in the array of output connectors. The switch system may include a switching circuit in communication with the first array of jumper connectors, the second array of jumper connectors, and the array of output connectors. A controller circuit in communication with the switching circuit controls the switching configuration of the switching circuit to associate signals received at the input connectors with certain of the output connectors.

Depending on the configurations of the array of the jumper connectors, a termination resistance can be matched to the input connectors in accordance with the needs of a given media system. For example, the first jumper connectors in the first array can provide electrical connections for the input connectors with a termination resistance that is preselected and about the same for more than one of the the input connectors.

Similarly, certain of the input connectors may be arranged via the jumper connections made by the jumper connectors to be available to connect to one or more output connectors. For example, the second array of second jumper connectors can be configured to route media signal received at the first array of input connectors to any of the first, second, and/or third arrays of output connectors.

The configuration of jumper connectors provides a quickly and easily configurable and scalable device suitable for many applications. By variously configuring the jumper connectors, one can join together multiple scalable switch devices in one system to provide multiple arrangements suitable for various numbers of media sources and output devices. In one example, two scalable switching devices are joined together to provide double the number of output connectors as compared to the number of input connectors. For example, one scalable switch device will be connected so that its input connectors are connected to a termination resistance while a second scalable switch device is configured such that its input connectors do not connect to a termination resistance. By connecting the media inputs in parallel between the two sets of input connectors provided by the two switch devices, the output connectors available for the multiple media sources is doubled. Such configurations of the scalable switching devices disclosed herein can provide a variety of connections between multiple media sources and multiple output devices.

The hardware used to create the jumper connectors configuration allows the switching device to be manufactured for a much reduced cost as compared to switching devices that are otherwise commercially available. Additionally, through configuration of the jumper connectors, multiple switching devices may be banded together for use on a single system to provide scalability to a variety of potential uses. These and other benefits may become clearer upon making a thorough review and study of the following detailed description.

BRIEF DESCRIPTION OF THE DRAWINGS

The above needs are at least partially met through provision of the scalable switching device and system described in the following detailed description, particularly when studied in conjunction with the drawings, wherein:

FIG. 3 comprises an example configuration of jumper arrays as configured in accordance with various embodiments of the invention;

FIG. 4 comprises a block diagram of a configuration of a switching device as configured in accordance with various embodiments of the invention;

FIG. 5 comprises a block diagram showing associations between input connectors and output connectors as configured in accordance with various embodiments of the invention;

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
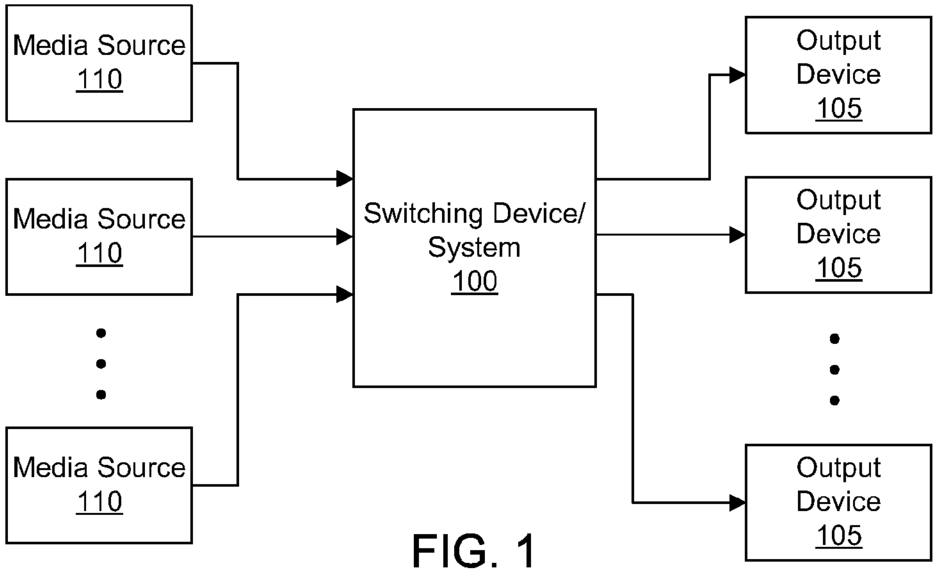
FIG. 1 comprises a block diagram of a media system using a switching device or system as configured in accordance with various embodiments of the invention.

Referring now to the drawings and in particular to FIG. 1, a scalable switch device or system 100 is connected to at least two and typically a plurality of output devices 105. At least one media source 110 is also connected to the switching device or system 100. The switching device or system 100 provides changeable connections between the media sources 110 and the output devices 105 where connections between the media sources 110 and the output devices 105 can be changed to make new connections and to connect different sources 110 with different output devices 105. The scalable switch device is scalable by itself and may be interconnected with other scalable switch devices in a system to connect various numbers of media sources to various numbers of output devices. The media sources may include any one or more of the following non-limiting examples: a cable TV input, a satellite TV input, on-line content, an audio media source, specially provided media content (for example: a content box configured to provide specialty programming from a dedicated source), pre-recorded media content (for example: media provided on a digital video disk ("DVD"), on video tape, or on a digital video recorder), or other media providers. An output device 105 may be any device able to play media, non-limiting examples include televisions, video display devices, projection systems and the like.

Figure 2:
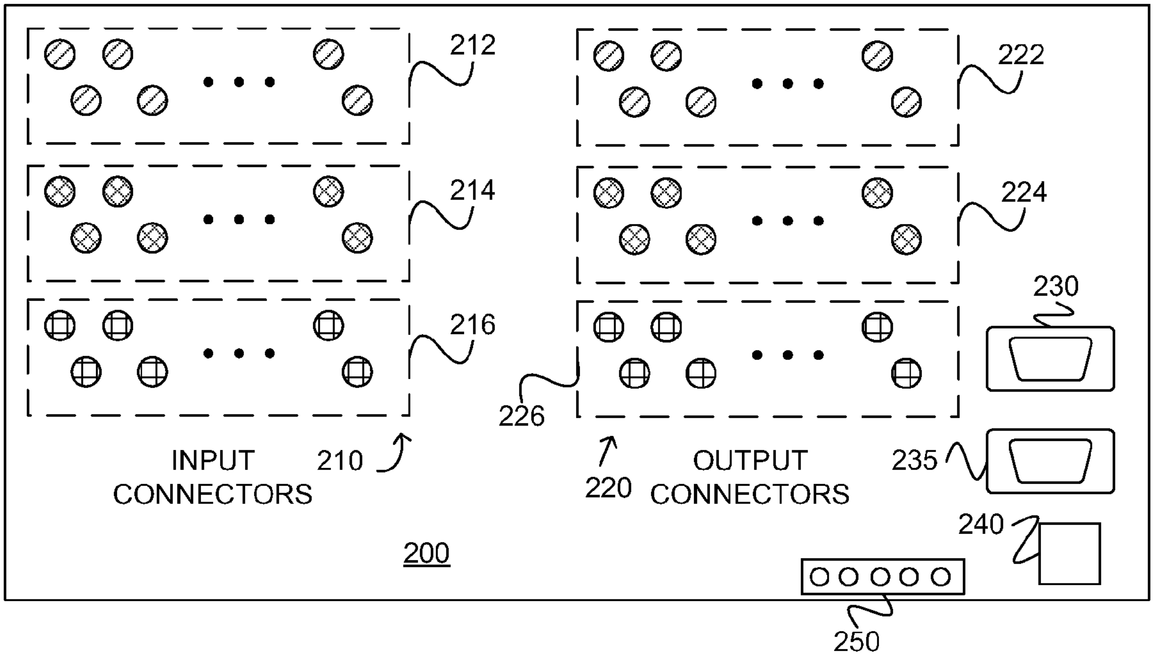
FIG. 2 comprises a top view of an example switching device as configured in accordance with various embodiments of the invention.

With reference to FIG. 2 a scalable switch device 200 includes an array of a plurality of input connectors 210 that are configured to receive media signals. Media signals are generally provided in one of several known forms. For example, media signals may be provided over composite connections. In another example, the media signals can be provided over component connections, which are also known as Y Pb Pr connections. Y, Pb, and Pr stand for the three different types of video signals provided over the three different cables of a typical component system: Y carries the luma or brightness information for the video signal, Pb carries information regarding the difference between blue and luma, and Pr carries information regarding the difference between red and luma. For example, the switching device 200 of FIG. 2 includes an array of input connectors 210 having three sub-arrays 212, 214, and 216 of pluralities of input connectors that correspond to the Y, the Pb and the Pr components of a component video system. Although this disclosure discusses example switching devices using this array of component input connectors, the teachings of this disclosure may be modified to work with various other media types such as digital signals, audio signals, HDTV, and the like.

The scalable switch device 200 also includes an array of output connectors 220 configured to provide and which provide media signals. Like the input connectors 210, the output connectors 220 include sub-arrays 222, 224 and 226 of pluralities of output connectors, corresponding to the three signals provided in a component media system. The scalable switching device 200 can also include at least one serial connector 230 and 235 through which control signals are provided from a separate computing device or a control system to a controller circuit of the scalable switch device 200. A network connection 240 may be supplied as an alternative means of communication with the scalable switching device 200. A series of light emitting diodes ("LEDs") 250 is provided to allow for visual indications of the status or state of the device 200.

With reference to FIG. 3, an example configuration of jumper connectors as disposed in the switching device of FIG. 2 will be discussed. A first array 302 of first jumper connectors is electrically connected to the array of input connectors to 210 such that at least one input connector of the array of input connectors 210 electrically connects to a first jumper connector. The jumper connectors of the first array 302 can be thought of as having three sub-arrays of jumper connectors 304, 306*a*, and 306*b* that correspond to the three sub-arrays of input connectors 212, 214, and 216. Because the first sub array 304 of first jumper connectors is configured differently from the other sub-arrays 306*a* and 306*b*, the discussion herein will discuss the second sub-arrays as a single sub-array 306. It will be understood that any number of arrays of input connectors and corresponding arrays of jumpers may be used in the context of the switching device described herein.

Jumpers are generally known in the art to include electrically conductive jumper pins or connectors that may be abridged by a jumper shunt, which is an electrically conductive connector that bridges the gap between two jumper pins. As shown in FIG. 3, the first array 302 includes jumper connectors with jumper shunts shown in black stretching between the two jumper pins of the jumper arrays such that the jumper pins in column 310 are electrically connected to the jumper pins of column 315. In this configuration, the input connector connected to the first array of jumper connectors is electrically connected to a termination resistance. The jumper connectors are typically anchored to a circuit board through which the various elements discussed herein can be electrically connected.

The second array of jumper connectors 350 is configured to make available to electrically connect one of two input connectors to one or more output connectors of the array of output connectors. In the example of FIG. 3, the column of jumper pins 360 is electrically connected to the input connectors associated with the second sub-array 306 of jumper connectors. The middle column of the second array 350 of jumper connectors is connected to an electrical switching circuit that arranges connections between the input connectors 210 and the output connectors 220. The third column of jumper connector pins 380 is not connected via a jumper shunt to other jumper pins. These pins are associated with the first sub-array of jumper connectors 304 such that the input connectors associated with the first sub-array 304 may be connected to the output connectors 220 via a second jumper configuration whereby the jumper shunts span between the jumper pins of column 380 and column 370 of jumper connectors.

Referring now to FIG. 4, the scalable switch device 200 also includes a switching circuit 410 in communication with the first array of jumper connectors 302, the second array of jumper connectors 350, and the array of output connectors 220. A controller circuit 420 is in communication with the switching circuit 410 to control the switching configuration at the switching circuit 410 to associate signals received at the input connectors 210 with certain of the output connectors 220. The controller circuit and switching circuit are generally known in the art. For example, the switching circuit 410 may comprise an AD8115 chip (three chips can be used to control the three sub-arrays of input and output connectors shown in the examples discussed herein). The AD8115 chips are controlled by a FREESCALE MC9S12NE64 microcontroller chip. The controlling circuit 420 may be in communication with an outside system through the serial connectors 230 or 235 or through a network connection 240 as shown in FIG. 2 such that the scalable switch device can be connected to and controlled as part of a larger media control system. Those skilled in the art will recognize and appreciate that such a processor as used for the controlling circuit can comprise a fixed-purpose hard-wired platform or can comprise a partially or wholly programmable platform. All of these architectural options are well known and understood in the art and require no further description here.

The switching circuit 410 provides the ability to control via software the association of media signals received at particular input connectors 210 with particular output connectors 220. In a typical approach, the various jumper connectors do not electrically connect via hardwire input connectors 210 to output connectors 220. Instead, the configuration of the jumper connectors makes available connections from the input connectors 210 to the output connectors 220 at the option of the switching circuit 410. As will be described further below, the jumper connectors can render certain input connectors unavailable for connection through the switching circuit 410 to the output connectors 220.

With reference again to FIGS. 2 and 3, the array of input connectors 210 includes a first sub-array 212 of input connectors configured such that the first sub-array 302 of input connectors is available for connection to one output connector of the array of output connectors 220 regardless of a jumper configuration of the first array of jumper connectors 302. In other words, the first sub-array 304 of jumper connectors is electrically connected to the first sub-array 212 of input connectors, and the first sub-array 304 of jumper connectors is configured to be available for electrical connection via the switching circuit 410 to the output connectors 220 regardless of the jumper configuration of the remaining jumper connectors. In this example, the array of input connectors 210 also includes at least a second sub-array 214 of input connectors electrically connected to a second sub-array of first jumper connectors 306. The second array of second jumper connectors 350 make available for connection to one of the output connectors 220 one of the group consisting of the second sub-array of input connectors 214 and the first sub-array of input connectors 212 depending on the jumper configuration of the second array of jumper connectors 350.

With continuing reference to FIG. 3, the first array of first jumper connectors 302 and the second array of second jumper connectors 350 are configured to make available to electrically connect the second sub-array of input connectors 214 to the output connectors 220. For example, the column of jumper pins 360 is shown as connected via jumper shunts to jumper pin column 370. In this example, the jumper column 360 is electrically connected to the second sub-array 306 of jumper connectors related to the second sub-array of input connectors 214. By connecting the second sub-array of input connectors 214 through the second array of jumper connectors 350 to the jumper pin column 370, the second sub-array 214 is made available to the switching circuit 410 for association to the output connectors 220. The configuration of jumper connectors as shown in FIG. 3, results roughly in the arrangement as shown in FIG. 5 wherein each group of input connectors 210 is associated with the corresponding group of output connectors 220 when the switching circuit 410 is in a simple one-to-one configuration.

The configuration of FIG. 3 is also such that the first sub-array of input connectors 212 and the second sub-array of input connectors 214 have a termination resistance in addition to being available to connect to the output connectors 220. The termination resistance is the electrical resistance at the electrical connections of the termination of the media source lines at the input connectors 210. In a typical video system, the termination resistance or resistance at the sink of the media input signal must have a resistance of 75 ohms to match the 75 ohm resistance that is typically present at the source of the media signals. Mismatch between the video source resistance and the video sink resistance will result in picture distortion. If the sink impedance at the switch device 200 or video sink is too high, then the picture will be too bright. If the sink impedance at the switch device 200 or video sink is too low, then the picture will be too dark. The termination resistance is provided by resistors on the circuit board that connect to the jumper connectors such that the termination resistance is selectively applied to the input connectors depending on the jumper configurations as described for example herein. So configured, the first jumper connectors in the first array can provide electrical connections for the input connectors with a termination resistance that is preselected and about the same for more than one of the input connectors.

Figure 6:
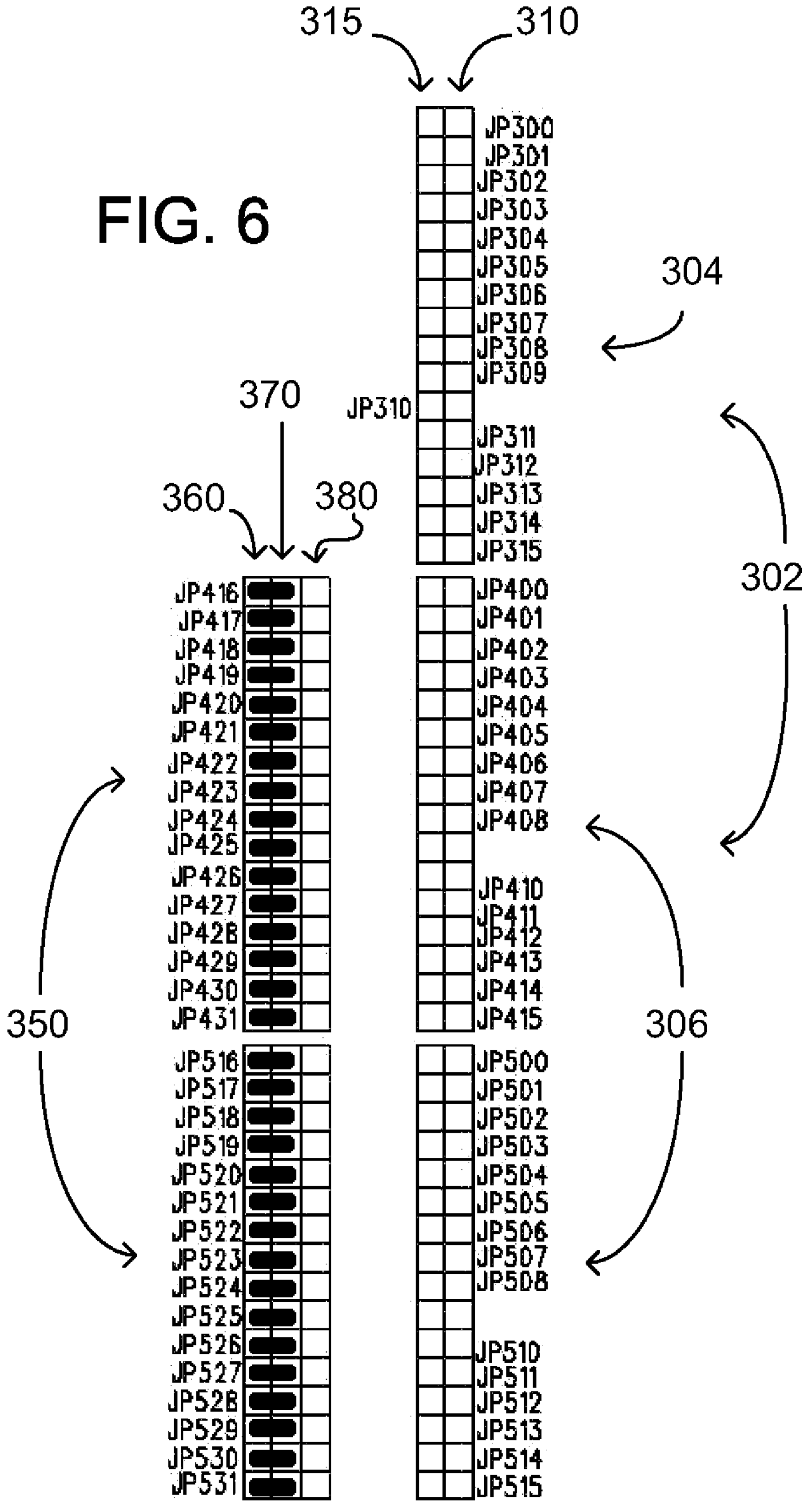
FIG. 6 comprises an example configuration of jumper arrays as configured in accordance with various embodiments of the invention.

By providing a first sub-array of first jumper connectors 302 that selectively connects the input connectors 210 to a termination resistance, the scalable switch 200 has the ability to match the termination resistance needs of various types of systems. For example, as shown in FIG. 6, the first array of first jumper connectors 302 is in a second configuration wherein there are no jumper connectors between the first column of jumper pins 310 and the second column of jumper pins 315; therefore, the input connections 210 are not connected to termination resistance. The second array of second jumper configurations 350 is connected as described above with reference to FIG. 3. The first array of first jumper connectors 302 and the second array of second jumper connectors 350 are configured to make available to electrically connect the first sub-array of input connectors 212 and the second sub-array of input connectors 214 to the output connectors 220. In this configuration, first sub-array of input connectors 212 and the second sub-array of input connectors 214 do not have a termination resistance and are available to connect to output connectors 220.

Figure 7:
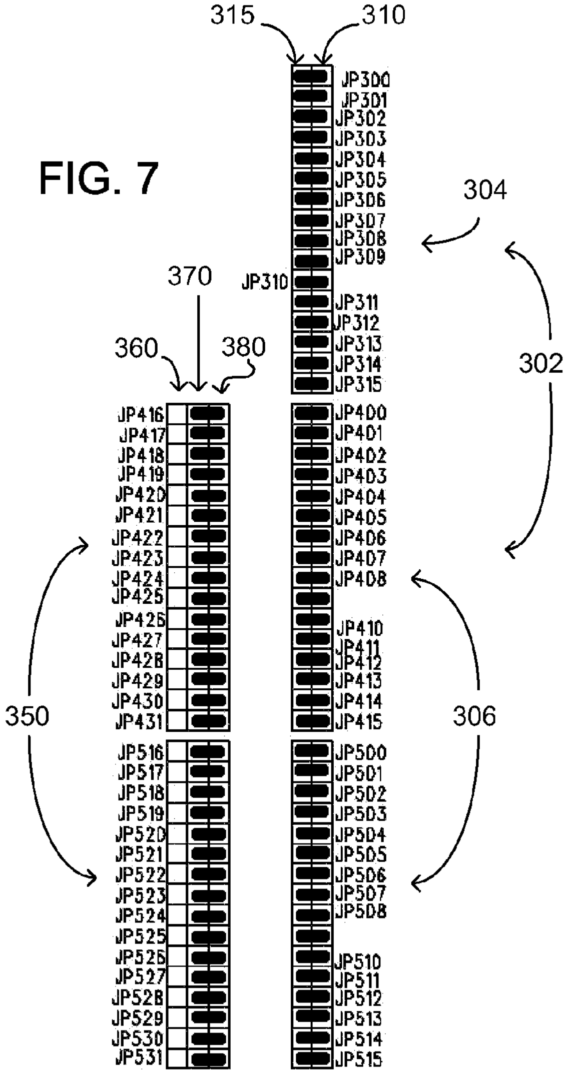
FIG. 7 comprises an example configuration of jumper arrays as configured in accordance with various embodiments of the invention.
Figure 9:
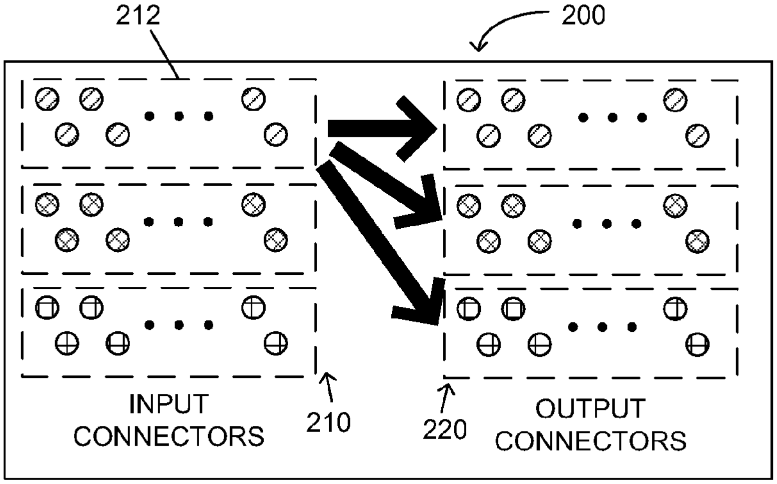
FIG. 9 comprises a block diagram showing associations between input connectors and output connectors as configured in accordance with various embodiments of the invention.

With reference to FIG. 7, the first array of first jumper connectors 302 are in the first configuration whereby the input connectors 210 associated with the first array of first jumper connectors 302 are connected to the termination resistance. The second sub-array of jumper connectors 350 is in a second configuration such that the jumpers electrically connect the column of jumper pins 370 with jumper pins column 380. In this configuration, first array of first jumper connectors 302 and a second array of jumper connectors 350 are configured to make available to electrically connect the first sub-array of input connectors 212 to the output connectors 220, and not the second sub-array of input connectors 214, such that the first sub-array of input connectors 212 has a termination resistance and are available to connect to at least two output connectors 220. As shown in FIG. 7, the input connectors 212 associated with the first sub-array 304 of jumper connectors can connect to at least three output connectors 220 because the column of jumper pins 380 of the second array of second jumper connectors 350 is electrically connected to or associated with the jumper connectors of the first sub-array 304. Accordingly, a media source plugged into an input connector of the first sub-array of input connectors 212 that is associated with the first sub-array 304 of first jumper connectors will in turn be associated in the simple switching configuration with three output connectors 220. One such configuration is shown conceptually in FIG. 9 wherein the input connectors of the first array of jumper connectors 212 are associated with each of the output connectors arrays 222, 224 and 226 such that each input connector is associated at least one output connector of each output connector array 222, 224 and 226.

Figure 8:
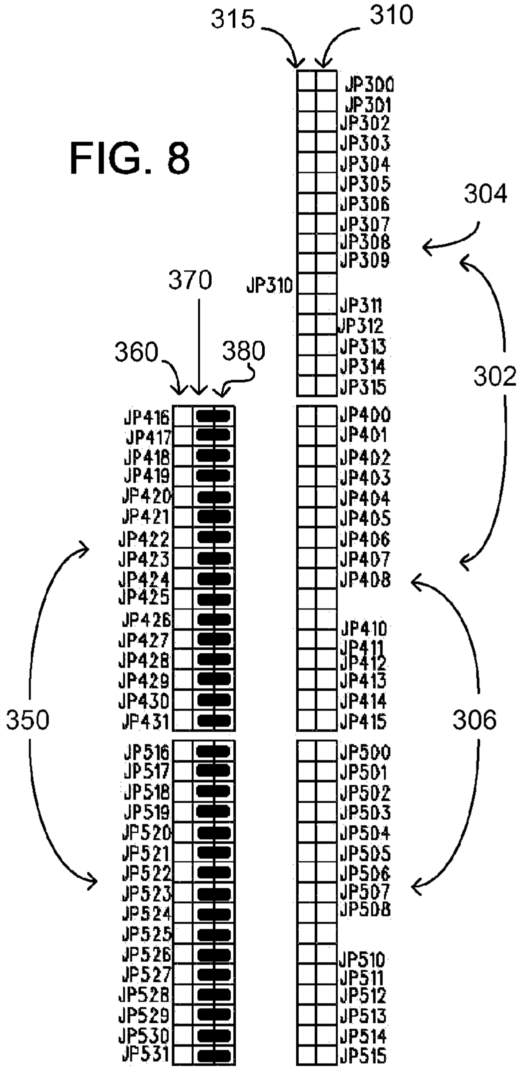
FIG. 8 comprises an example configuration of jumper arrays as configured in accordance with various embodiments of the invention.

With reference to FIG. 8, the configuration of jumper connectors is a combination of those discussed above with reference to FIGS. 6 and 7. In this configuration, the first array of first jumper connectors 302 are not connected to a termination resistance. In other words, the first array of first jumper connectors 302 are in a second jumper configuration, with no jumper connectors between jumper pin column 310 and jumper pin column 315. The second array of second jumper connectors 350 is configured in accordance with the discussion above with reference to FIG. 7. Accordingly, the device 200 is configured in FIG. 8 with the first array of first jumper connector 302 and the second array of second jumper connector 350 configured to make available to electrically connect a first sub-array of input connectors 212 to the output connectors 220 such that the first sub-array of input connectors 212 has no termination resistance and is available to connect to at least two output connectors 220.

A method of connecting a plurality of media inputs to a plurality of output devices via such a scalable switching device includes receiving media signals at an array of input connectors. The method also includes electrically connecting a first array of first jumper connectors to the array of input connectors such that at least one input connector of the array of input connectors electrically connects to a first jumper connector and the input connector connected to the first jumper connector is electrically connected to a termination resistance when the first jumper connector for the input connector is in a first jumper configuration. The method allows making available to electrically connect via a second array of second jumper connectors one of at least two input connectors to an output connector of the array of output connectors to provide the media signals at the array of output connectors. In one approach, the method includes configuring the second array of second jumper connectors to connect each of at least one input connector to at least two output connectors. By another approach, the method includes configuring the second array of second jumper connectors to make available to connect each input connector to at least one output connector.

Because of the variety of configurations available between input connectors, termination resistances, and output connectors, more than one scalable switch may be interconnected to create a scalable switching system. Such a scalable switching system can include a plurality of scalable switches configurable to receive more distinct media signals than one scalable switch has input connectors and/or be able to output more distinct media signals than one scalable switch has output connectors. A method of connecting a plurality of media inputs to a plurality of output devices via at least two scalable switching devices includes receiving media signals in parallel at an array of input connectors of at least a first scalable switching device configured to provide a termination resistance and at least a second scalable switching device configured to not provide a termination resistance. Media signals can then be provided at an array of output connectors of at least the first scalable switching device and the second scalable switching device.

Figure 10:
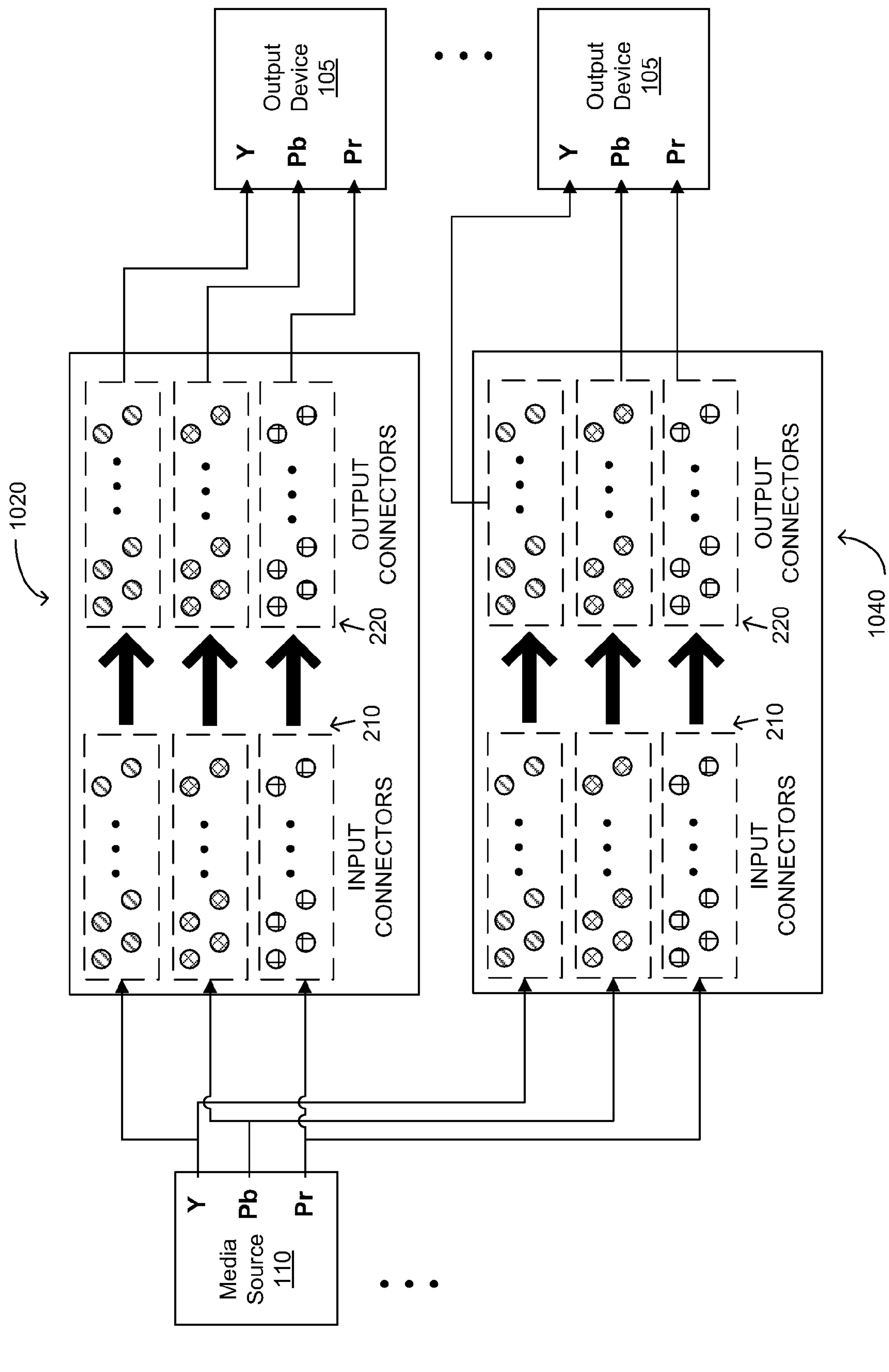
FIG. 10 comprises a block diagram of an example switching system with two switching devices as configured in accordance with various embodiments of the invention.

For example, and as shown in FIG. 10, two scalable switches may be connected together to provide sixteen input connectors to receive media signals and to provide thirty-two outputs for those media signals. In this example, each sub-array of input connectors 214, 212 and 216 include sixteen connectors. Accordingly, each scalable switch can accommodate sixteen media signals, each comprising three component signals: the Y signal, Pb signal, and Pr signal. The first scalable switch 1020 is configured in accordance with the configuration shown in FIGS. 3 and 5, such that each input connector 210 is in communication with or has a terminal resistance and such that each input connector 210 is in the simplest switching circuit configuration and connected to an output connector 220. The second scalable switch 1040 is configured in accordance with the jumper connector configuration of FIG. 6 such that the input connectors 210 are not connected to a termination resistance, but each input connector 210 is associated with one output connector 220 as shown in FIG. 5.

Each of the sixteen media signals input to the system from the media source 110 is split so that it is connected in parallel to each of two input connectors 210: one at the first scalable switch 1020 and one at the second scalable switch 1040. Accordingly, each media source 110 input signal has a termination resistance of 75 ohms at the video sink of the input connectors 210. This provides proper matching of the termination resistance at the switch system to the resistance at the video source, which is typically 75 ohms. A single media input signal, therefore, can be split between the first scalable switch 1020 and the second scalable switch 1040 and still maintain the proper termination resistance. By splitting between the first scalable switch 1020 and the second scalable switch 1040, the media input signal can be associated with at least one output connector at each of the scalable switches 1020 and 1040.

Figure 11:
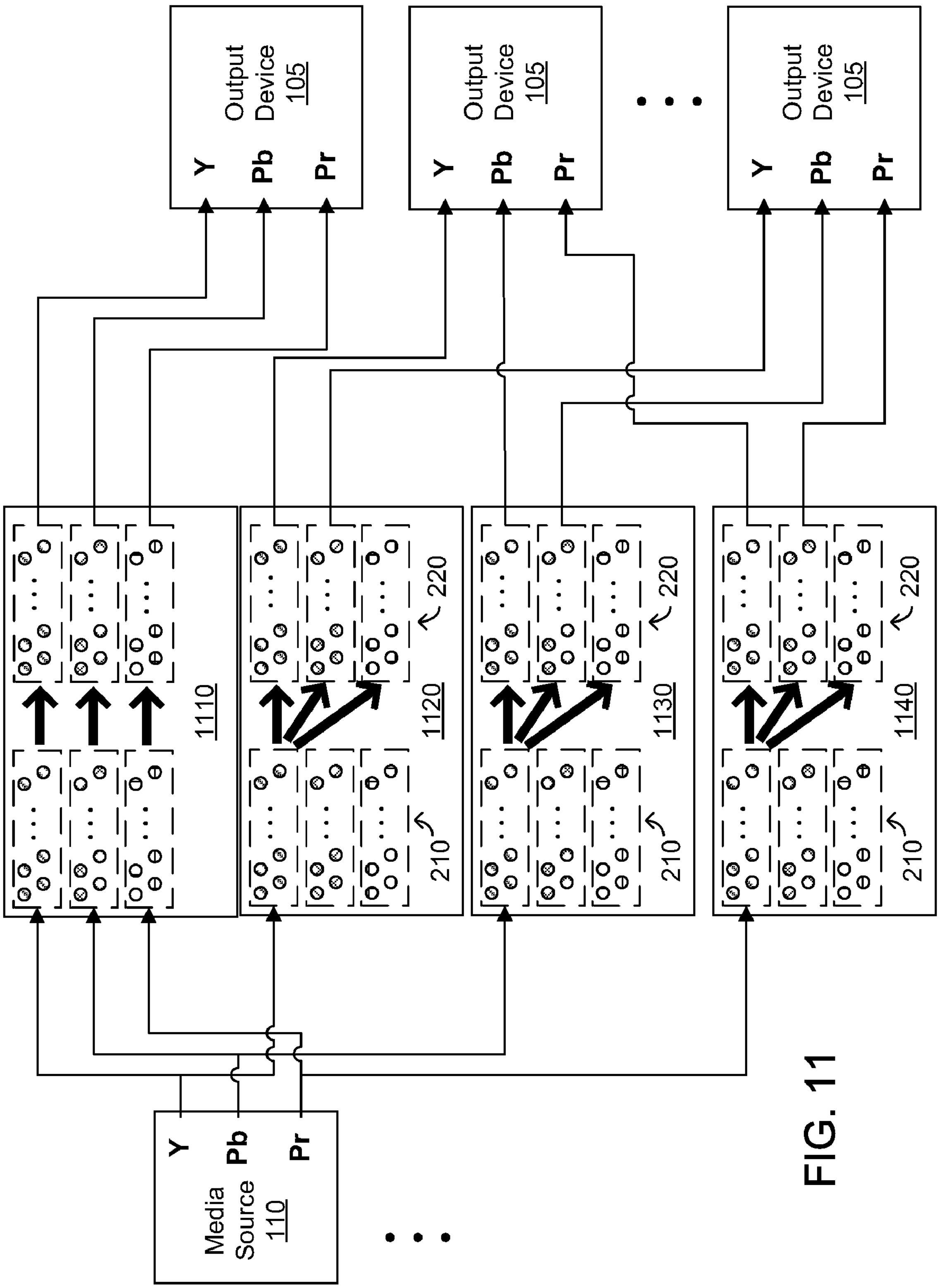
FIG. 11 comprises a block diagram of an example switching system with four switching devices as configured in accordance with various embodiments of the invention.

With reference to FIG. 11, yet another example of a scalable switching system using a plurality of scalable switches will be described. The switching system includes a first scalable switch 1110, a second scalable switch 1120, a third scalable switch 1130, and a fourth scalable switch 1140. In this example, the first scalable switch 1110 has its jumper configurations configured similar to that as shown in FIG. 3. The second scalable switch 1120, the third scalable switch 1130, and the fourth scalable switch 1140 are configured in accordance with the jumper configuration shown and described in connection with FIG. 8. The media input signal from a media source 110 may be split and connected to input connectors for all four scalable switches 1110, 1120, 1130, and 1140, such that the media source signals are linked to one termination resistance to match the resistance for the media source 110 and be associated with an output of the first scalable switch 1110, the second scalable switch 1120, the third scalable switch 1130, and the fourth scalable switch 1140.

So configured, the switching device as described herein provides for a variety of switching and connection capabilities. A single switching device can provide for configurations including multiple termination resistance configurations and input/output associations. By configuring the relatively simple jumper connectors, further flexibility is available by combining together multiple switching devices in a variety of fashions as discussed herein and as may be otherwise recognizable by one skilled in the art to size the switching system to many media source/media output configurations. The jumper connector configuration of the switch device allows the cost of the switching device to remain relatively low as compared to commercially available switch devices.

Those skilled in the art will recognize that a wide variety of modifications, alterations, and combinations can be made with respect to the above described embodiments without departing from the spirit and scope of the invention. For example, various additional configurations and combinations of scalable switching systems may be contemplated and applied. Additionally, the switches as described herein may be modified to handle a variety of types of media signals such as audio signals, composite signals, high definition signals, component signals, and the like. Such modifications, alterations and combinations are to be viewed as being within the ambit of the invention concept.

What is claimed is:

1. A switch system for connecting a plurality of media output devices to a plurality of media sources, the system comprising:

an array of a plurality of input connectors that receive media signals;

a first array of a plurality of first jumper connectors electrically connected to the input connectors, the first jumper connectors in the first array providing electrical connections for the input connectors with a termination resistance that is preselected and about the same for more than one of the input connectors;

an array of output connectors configured to provide media signals;

a second array of a plurality of second jumper connectors configured to electrically connect the input connectors via the first array of first jumper connectors to the output connectors in the array of output connectors.

2. The scalable switch system of claim 1 further comprising:

a switching circuit in communication with the first array of jumper connectors, the second array of jumper connectors, and the array of output connectors;

a controller circuit in communication with the switching circuit to control a switching configuration of the switching circuit to associate signals received at the input connectors with certain of the output connectors.

3. The scalable switch system of claim 1 further comprising: a circuit board electrically connecting the input connectors to the first array of first jumper connectors, at least a portion of the first array of first jumper connectors to the second array of second jumper connectors, and the second array of second jumper connectors to the output connectors.

4. A scalable switch system for connecting a plurality of output devices to at least one media source comprising:

an array of input connectors configured to receive media signals;

a first array of first jumper connectors electrically connected to the array of input connectors such that at least one input connector of the array of input connectors electrically connects to a first jumper connector and the input connector connected to the first jumper connector is electrically connected to a termination resistance when the first jumper connector for the input connector is in a first jumper configuration;

an array of output connectors configured to provide media signals;

a second array of second jumper connectors configured to make available to electrically connect one of at least two input connectors via the first array of first jumper connectors to an output connector of the array of output connectors.

5. The scalable switch system of claim 4 further comprising:

a switching circuit in communication with the first array of jumper connectors, the second array of jumper connectors, and the array of output connectors;

a controller circuit in communication with the switching circuit to control a switching configuration of the switching circuit to associate signals received at the input connectors with certain of the output connectors.

6. The scalable switch system of claim 4 wherein:

the array of input connectors comprises a first sub-array of input connectors configured such that each of the first sub-array of input connectors is available for connection to one output connector of the array of output connectors regardless of a jumper configuration of the first array of jumper connectors;

the array of input connectors comprises a second sub-array of input connectors; and the second array of second jumper connectors make available for connection to one of the output connectors one of a group consisting of the second sub-array of input connectors and the first sub-array of input connectors depending on a jumper configuration of the second array of second jumper connectors.

7. The scalable switch system of claim 6 wherein the first array of first jumper connectors and the second array of second jumper connectors are configured to make available to electrically connect the second sub-array of input connectors to the output connectors and such that the first sub-array of input connectors and the second sub-array of input connectors have a termination resistance and are available to connect to output connectors.

8. The scalable switch system of claim 6 wherein the first array of first jumper connectors and the second array of second jumper connectors are configured to make available to electrically connect the first sub-array of input connectors to the output connectors and such that the first sub-array of input connectors has a termination resistance and is available to connect to at least two output connectors.

9. The scalable switch system of claim 6 wherein the first array of first jumper connectors and the second array of second jumper connectors are configured to make available to electrically connect the second sub-array of input connectors to the output connectors and such that the first sub-array of input connectors and the second sub-array of input connectors do not have a termination resistance and are available to connect to output connectors.

10. The scalable switch system of claim 6 wherein the first array of first jumper connectors and the second array of second jumper connectors are configured to make available to electrically connect the first sub-array of input connectors to the output connectors and such that the first sub-array of input connectors does not have a termination resistance and is available to connect to at least two output connectors.

11. A scalable switching system comprising:

a plurality of scalable switches, each comprising:

an array of input connectors configured to receive media signals;

a first array of first jumper connectors electrically connected to the array of input connectors such that at least one input connector of the array of input connectors electrically connects to a first jumper connector and the input connector connected to the first jumper connector is electrically connected to a termination resistance when the first jumper connector for the input connector is in a first jumper configuration;

an array of output connectors configured to provide media signals;

a second array of second jumper connectors wherein at least some of the second jumper connectors are configured to make available to electrically connect one of at least two input connectors to an output connector of the array of output connectors;

the array of input connectors comprising a first sub-array of input connectors configured such that each of the first sub-array of input connectors is available to connect to an output connector of the array of output connectors regardless of a jumper configuration of the first array of first jumper connectors;

the array of input connectors comprises a second sub-array of input connectors; and the second array of second jumper connectors make available to connect at least one of the output connectors to one of a group consisting of the second sub-array of input connectors and the first sub-array of input connectors depending on a jumper configuration of the second array of second jumper connectors;

wherein the plurality of scalable switches are interconnected such that the scalable switching system is configurable in at least one configuration of the group consisting of:

able to receive more distinct media signals than one scalable switch has input connectors; and able to output more distinct media signals than one scalable switch has output connectors.

12. A scalable switching system comprising:

at least a first scalable switch and a second scalable switch, each comprising:

an array of input connectors configured to receive media signals;

a first array of first jumper connectors electrically connected to the array of input connectors such that at least one input connector of the array of input connectors electrically connects to a first jumper connector and the input connector connected to the first jumper connector is electrically connected to a termination resistance when the first jumper connector for the input connector is in a first jumper configuration;

an array of output connectors configured to provide media signals;

a second array of second jumper connectors wherein at least some of the second jumper connectors are configured to make available to electrically connect one of at least two input connectors to an output connector of the array of output connectors;

the array of input connectors comprising a first sub-array of input connectors configured such that each of the first sub-array of input connectors is available to connect to an output connector of the array of output connectors regardless of a jumper configuration of the first array of jumper connector;

the array of input connectors comprises a second sub-array of input connectors; and the second array of second jumper connectors make available to connect at least one of the output connectors to one of the group consisting of the second sub-array of input connectors and the first sub-array of input connectors depending on a jumper configuration of the second array of second jumper connectors;

wherein the first scalable switch is configured such that the first array of first jumper connectors and the second array of second jumper connectors are configured to make available to electrically connect the second sub-array of input connectors to the output connectors and such that the first sub-array of input connectors and the second sub-array of input connectors have a termination resistance and are available to connect to output connectors;

wherein the second scalable switch is configured such that the first array of first jumper connectors and the second array of second jumper connectors are configured to make available to electrically connect the second sub-array of input connectors to the output connectors and such that the first sub-array of input connectors and the second sub-array of input connectors do not have a termination resistance and are available to connect to output connectors;

wherein the input connectors of the first scalable switch and the input connectors of the second scalable switch are electrically connected such that a media input signal is associable with output connectors for the first scalable switch and the second scalable switch.

13. A scalable switching system comprising:

at least a first scalable switch, a second scalable switch, a third scalable switch, and a fourth scalable switch each comprising:

an array of input connectors configured to receive media signals;

a first array of first jumper connectors electrically connected to the array of input connectors such that at least one input connector of the array of input connectors electrically connects to a first jumper connector and the input connector connected to the first jumper connector is electrically connected to a termination resistance when the first jumper connector for the input connector in a first jumper configuration;

an array of output connectors configured to provide media signals;

a second array of second jumper connectors wherein at least some of the second jumper connectors are configured to make available to electrically connect one of at least two input connectors to an output connector of the array of output connectors;

the array of input connectors comprising a first sub-array of input connectors configured such that each of the first sub-array of input connectors is available to connect to an output connector of the array of output connectors regardless of a jumper configuration of the first array of jumper connector;

the array of input connectors comprises a second sub-array of input connectors; and the second array of second jumper connectors make available to connect at least one of the output connectors to one of the group consisting of the second sub-array of input connectors and the first sub-array of input connectors depending on a jumper configuration of the second array of second jumper connectors;

wherein the first scalable switch is configured such that the first array of first jumper connectors and the second array of second jumper connectors are configured to make available to electrically connect the second sub-array of input connectors to the output connectors and such that the first sub-array of input connectors and the second sub-array of input connectors have a termination resistance and are available to connect to output connectors;

wherein the second scalable switch, third scalable switch, and fourth scalable switch are configured such that the first array of first jumper connectors and the second array of second jumper connectors of the second scalable switch, third scalable switch, and fourth scalable switch are configured to make available to electrically connect the first sub-array of input connectors to the output connectors and such that each of the first sub-array of input connectors do not have a termination resistance and are available to connect to at least two output connectors;

wherein the input connectors of the first scalable switch are electrically connected to the input connectors of the second scalable switch, third scalable switch, and fourth scalable switch such that each media input signal is associated with one termination resistance and able to be associated with output connectors of the first scalable switch, the second scalable switch, the third scalable switch, and the fourth scalable switch.

14. A method of connecting a plurality of media inputs to a plurality of output devices via a scalable switching device comprising:

receiving media signals at an array of input connectors;

electrically connecting a first array of first jumper connectors to the array of input connectors such that at least one input connector of the array of input connectors electrically connects to a first jumper connector and the input connector connected to the first jumper connector is electrically connected to a termination resistance when the first jumper connector for the input connector is in a first jumper configuration;

making available to electrically connect via a second array of second jumper connectors one of at least two input connectors to an output connector of the array of output connectors to provide the media signals at the array of output connectors.

15. The method of claim 14 wherein the step of making available to electrically connect via a second array of second jumper connectors one of at least two input connectors to an output connector of the array of output connectors to provide the media signals at the array of output connectors further comprises configuring the second array of second jumper connectors to connect each of at least one input connector to at least two output connectors.

16. The method of claim 14 wherein the step of making available to electrically connect via a second array of second jumper connectors one of at least two input connectors to an output connector of the array of output connectors to provide the media signals at the array of output connectors further comprises configuring the second array of second jumper connectors to make available to connect each input connector to at least one output connector.

17. A method of connecting a plurality of media inputs to a plurality of output devices via at least two scalable switching devices comprising:

receiving media signals in parallel at an array of input connectors of at least a first scalable switching device configured to provide a termination resistance and at least a second scalable switching device configured to not provide a termination resistance;

providing the media signals at an array of output connectors of at least the first scalable switching device and the second scalable switching device.

18. A method of connecting a plurality of media inputs to a plurality of output devices via a scalable switching system comprising:

receiving media signals at an array of input connectors;

configuring an array of jumper connectors to match termination resistances for the media signals;

providing the media signals at an array of output connectors.

19. The method of claim 18 wherein the step of providing the media signals at an array of output connectors further comprises making available to electrically connect via a second array of second jumper connectors one of at least two input connectors to an output connector of the array of output connectors to provide the media signals at the array of output connectors.

20. The method of claim 19 wherein the step of making available to electrically connect via a second array of second jumper connectors one of at least two input connectors to an output connector of the array of output connectors to provide the media signals at the array of output connectors further comprises configuring the second array of second jumper connectors to connect each of at least one input connector to at least two output connectors.

21. The method of claim 19 wherein the step of making available to electrically connect via a second array of second jumper connectors one of at least two input connectors to an output connector of the array of output connectors to provide the media signals at the array of output connectors further comprises configuring the second array of second jumper connectors to make available to connect each input connector to at least one output connector.

* * * * *